(12) United States Patent
Ho et al.

(10) Patent No.: US 8,145,813 B2
(45) Date of Patent: Mar. 27, 2012

(54) ELECTRONIC DEVICE UTILIZING CONNECTING PORT FOR CONNECTING CONNECTOR TO TRANSMIT/RECEIVE SIGNALS WITH CUSTOMIZED FORMAT

(75) Inventors: Yung-Yuan Ho, Tainan County (TW); Yen-Chen Chen, Tainan County (TW); Pao-Wang Liao, Tainan County (TW)

(73) Assignees: Himax Display, Inc., Tainan Science-Based Industrial Park, Tainan (TW); Himax Technologies Limited, Fonghua Village, Xinshi Dist., Tainan (TW)

( * ) Notice: Subject to any disclaimer, the term of this patent is extended or adjusted under 35 U.S.C. 154(b) by 21 days.

(21) Appl. No.: 12/576,224

(22) Filed: Oct. 8, 2009

(65) Prior Publication Data

US 2010/0106878 A1  Apr. 29, 2010

Related U.S. Application Data

(60) Provisional application No. 61/108,035, filed on Oct. 24, 2008.

(51) Int. Cl.
*G06F 13/10* (2006.01)
*G06F 13/14* (2006.01)
*H04N 3/27* (2006.01)

(52) U.S. Cl. ........................... 710/62; 345/520; 348/554

(58) Field of Classification Search ............... 710/62–65, 710/68–73, 100, 300–304, 305; 348/553–554; 345/501, 520; 386/231–232
See application file for complete search history.

(56) References Cited

U.S. PATENT DOCUMENTS

| | | | |
|---|---|---|---|
| 2007/0009232 A1* | 1/2007 | Muraki et al. | 386/95 |
| 2007/0222955 A1* | 9/2007 | Kubota | 355/18 |
| 2007/0248328 A1* | 10/2007 | Khan et al. | 386/96 |
| 2008/0126812 A1* | 5/2008 | Ahmed et al. | 713/189 |
| 2008/0239639 A1* | 10/2008 | Yun | 361/681 |
| 2009/0178097 A1* | 7/2009 | Kim et al. | 725/114 |
| 2009/0300243 A1* | 12/2009 | Chao | 710/71 |
| 2010/0073560 A1* | 3/2010 | Kitano et al. | 348/554 |
| 2010/0231788 A1* | 9/2010 | Tseng et al. | 348/512 |

* cited by examiner

*Primary Examiner* — Mark Rinehart
*Assistant Examiner* — Trisha Vu
(74) *Attorney, Agent, or Firm* — Winston Hsu; Scott Margo

(57) ABSTRACT

An electronic device includes: a first output port, a processing circuit and a bridge circuit. The first output port is configured for connecting a connector with a connector type complying with a specific signal transmission standard. The processing circuit is utilized for processing an input data to generate an output data. The bridge circuit is coupled between the processing circuit and the first output port, and utilized for receiving the output data generated from the processing circuit, converting the output data into an output signal which has a physical layer compliant with the specific signal transmission standard and a protocol layer different from the specific signal transmission standard, and then outputting the output signal to the first output port.

13 Claims, 7 Drawing Sheets

ELECTRONIC DEVICE UTILIZING CONNECTING PORT FOR CONNECTING CONNECTOR TO TRANSMIT/RECEIVE SIGNALS WITH CUSTOMIZED FORMAT

CROSS REFERENCE TO RELATED APPLICATIONS

This application claims the benefit of U.S. Provisional Application No. 61/108,035, which was filed on Oct. 24, 2008 and is incorporated herein by reference.

BACKGROUND OF THE INVENTION

1. Field of the Invention

The present invention relates to electronic devices, and more particularly, to an electronic device utilizing a connecting port for connecting a connector with a connector type complying with a specific signal transmission standard (e.g. USB standard) to transmit/receive signals which have a physical layer compliant with the specific signal transmission standard and a protocol layer different from the specific signal transmission standard.

2. Description of the Prior Art

In recent times, handheld computers and electronic devices such as Mobile Internet Devices (MID) or Netbooks have been widely used in commercial markets. The handheld computer or electronic device may have to connect an external display apparatus in some applications. For example, in a business conference, the MID is used to connect an external projector for showing data or graphs to participants. However, with the trend of scale-down of electronic devices and external display apparatus (e.g. portable projectors), the conventional display connectors and connecting ports (e.g. D-sub connector or DVI connector) may be inadequate since they are of relatively large size compared with the confined areas on the body of scaled down portable/handheld devices.

The size of conventional connectors means the manufacturer must preserve certain areas on the body of an electronic device for fitting the connecting ports that couple to the connector of different video signal formats. As a result, if designers attempt to design the electronic device to support more external display apparatus, the size of the electronic device will be limited by the types of connectors and numbers of connecting ports.

SUMMARY OF THE INVENTION

Compared with the conventional video transmission interfaces, the Universal Serial Bus (USB) interface has a smaller connector and a relatively thin cable, which is more convenient for users to carry. Moreover, since USB interface is already widely used in general data transmission, most electronic devices are provided with USB ports. Thus, the present invention provides a concept of conveying video signals encoded in a customized format that does not comply with USB standards over the commonly-existing USB connector and connecting ports. The encoded video signals have a physical layer compliant with the USB standard and a protocol layer different from the USB standard. Due to the popularity of USB interface, the manufacturers can save video connecting ports on the electronic device, thereby increasing convenience and decreasing the hardware costs. Furthermore, the video signals conveyed over the USB port are not encoded with the USB standard, which provides more flexibility in designing a display solution of handheld/portable electronic devices.

One objective of the present invention is therefore to provide electronic devices including a handheld computer and a handheld projector that utilize USB connectors and connecting ports to transmit signals for displaying. However, other connecting ports and connector may also be feasible.

According to one exemplary embodiment of the present invention, an electronic device is provided. The electronic device comprises: a first output port, a processing circuit and a bridge circuit. The first output port is configured for connecting a connector with a connector type complying with a specific signal transmission standard. The processing circuit is utilized for processing an input data to generate an output data. The bridge circuit is coupled between the processing circuit and the first output port. In addition, the bridge circuit is utilized for receiving the output data generated from the processing circuit, converting the output data into an output signal which has a physical layer compliant with the specific signal transmission standard and a protocol layer different from the specific signal transmission standard, and then outputting the output signal to the first output port.

According to another exemplary embodiment of the present invention, an electronic device is provided. The electronic device comprises: an input port and a control circuit. The input port is configured for receiving a plurality of input signals through a connector with a connector type complying with a specific signal transmission standard, wherein the input signals which have a physical layer compliant with the specific signal transmission standard and a protocol layer different from the specific signal transmission standard. The control circuit is coupled to the input port, and utilized for generating a plurality of display signals corresponding to the input signals.

Preferably, the specific signal transmission standard is a universal serial bus (USB) standard.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
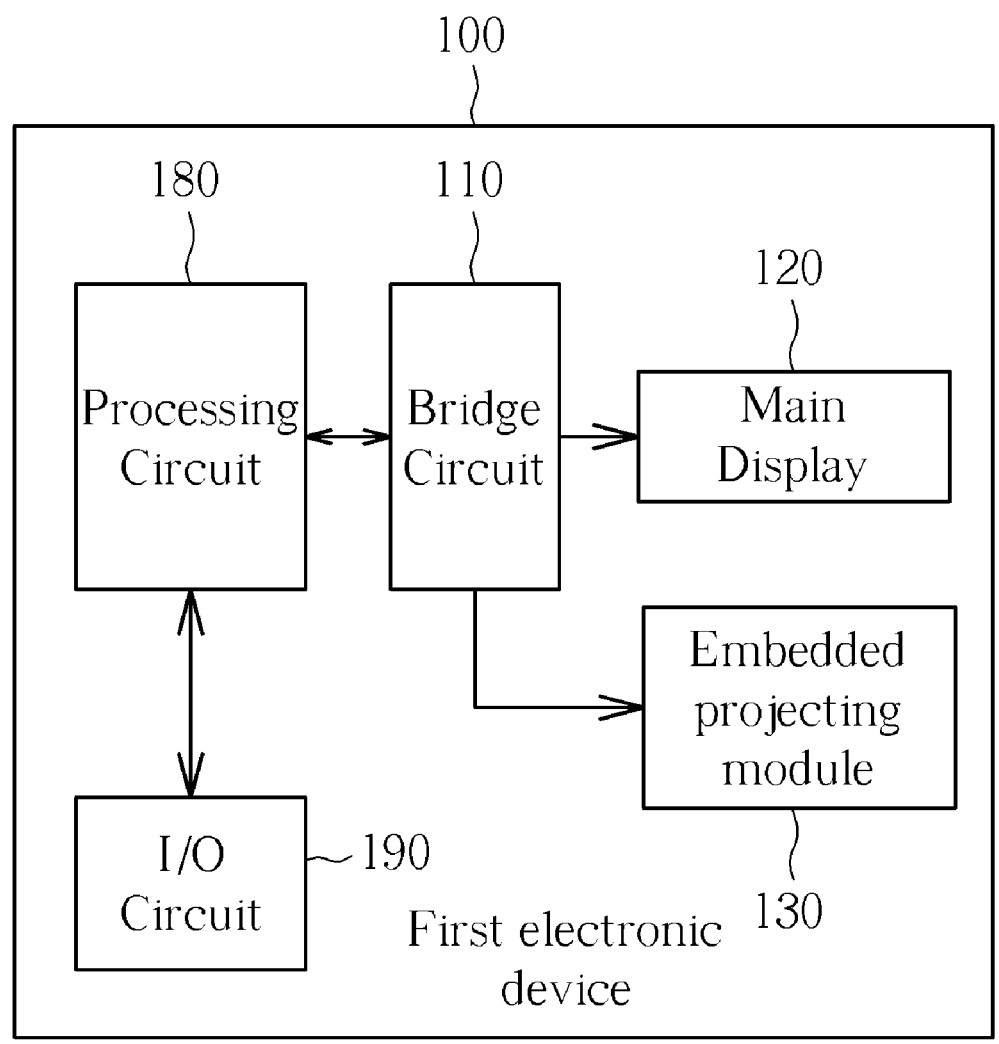
FIG. 1 is a block diagram of a first electronic device according to a first exemplary embodiment of the present invention.

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections Please refer to FIG. 1, which depicts a first embodiment of the present invention. A first electronic device 100 includes (but is not limited to): a processing circuit 180 (e.g. a CPU), an I/O circuit 190, a bridge circuit 110, a main display 120, an embedded projecting module 130. In addition, the first electronic device 100 could be an MID (Mobile Internet Device) or a Netbook. In accordance with one embodiment of the present invention, the bridge circuit 110 is a MIPI DSI bridge circuit. The processing circuit 180 generates video frame according to input data (which could be a multimedia file in a storage device or a streaming video over the Internet), and then transmits video frame data corresponding to each video frame to the bridge circuit 110.

The bridge circuit 110 encodes all received video frame data into display signals such as RGB component signals so that the received video frame data can be correctly received and displayed by the main display 120 and the embedded projecting module 130, respectively. The essence of the bridge circuit 110 is protocol conversion. Moreover, in another embodiment, the received data could be encoded as display signals of other formats (e.g. YUV format) and then transmitted to the main display 120 or the embedded projecting module 130. The bridge circuit 190 may perform video processing upon the received video frame data according to actual requirements (e.g. resolution scaling or contrast enhancement), and compresses the video frame data if needed. Briefly, the first embodiment of the present invention discloses an electronic device provided with two different display apparatus and how to control the two different display apparatus.

Figure 2:
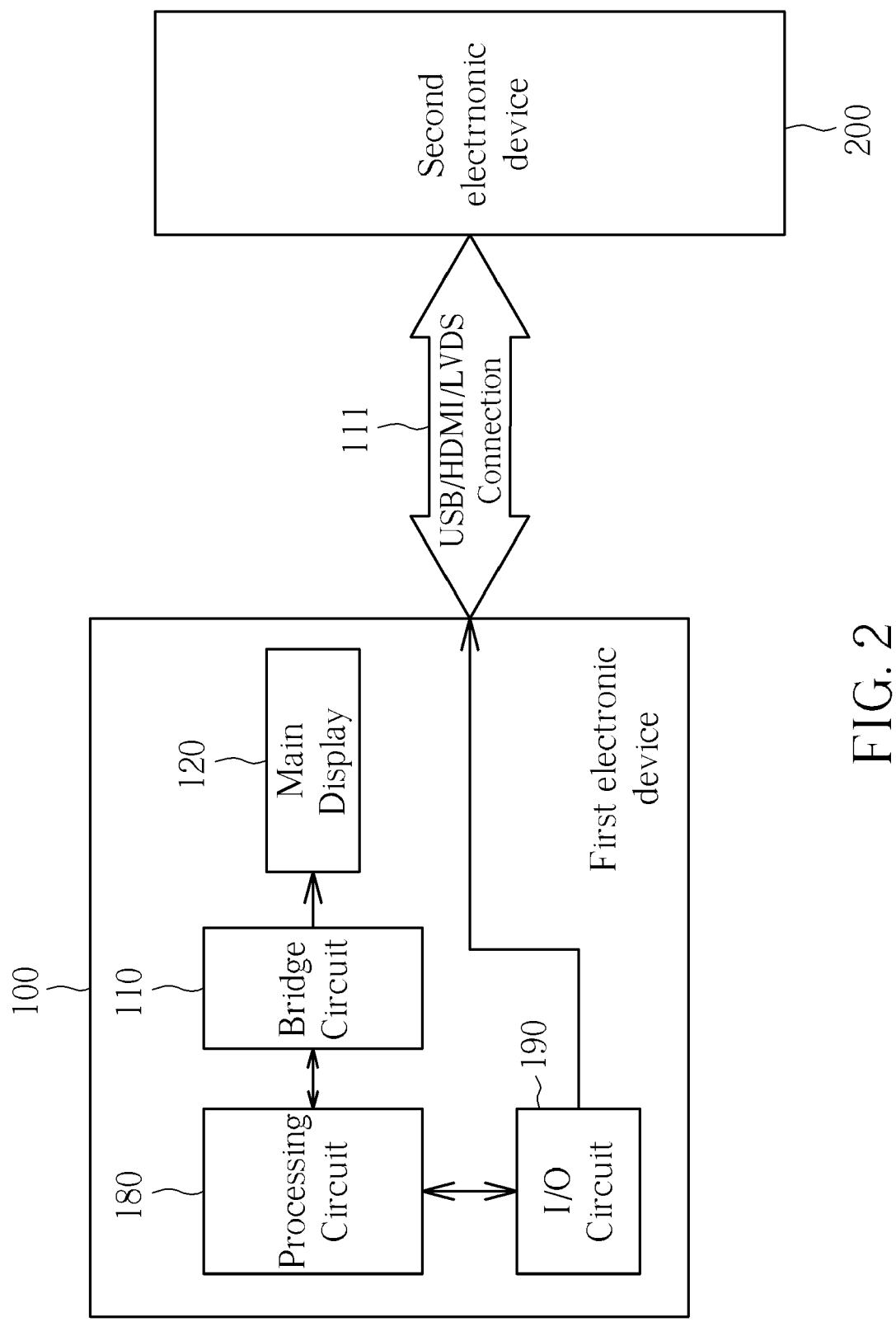
FIG. 2 is a block diagram of a first and second electronic devices according to a second exemplary embodiment of the present invention.

Please refer to FIG. 2, which depicts a second embodiment of the present invention. Compared to the above-mentioned embodiment, a second electronic device 200 is further included in the second embodiment. The second electronic device 200 could be a portable projector and coupled to the first electronic device 100. The first and the second electronic devices are connected via a connection 111 which could be a USB connection, an HDMI connection or an LVDS connection. By the USB/HDMI/LVDS connection 110, video frame data can be transmitted from the first electronic device to the second electronic device. In this embodiment, the processing circuit 180 processes input data to output data and transmits the output data to the I/O circuit 190. Accordingly, the I/O circuit 190 can encode the output data into signals which are fully compliant with one of USB, HDMI and LVDS standards according to different requirements. Thus, the signals can be transmitted over the connection 111.

Figure 3:
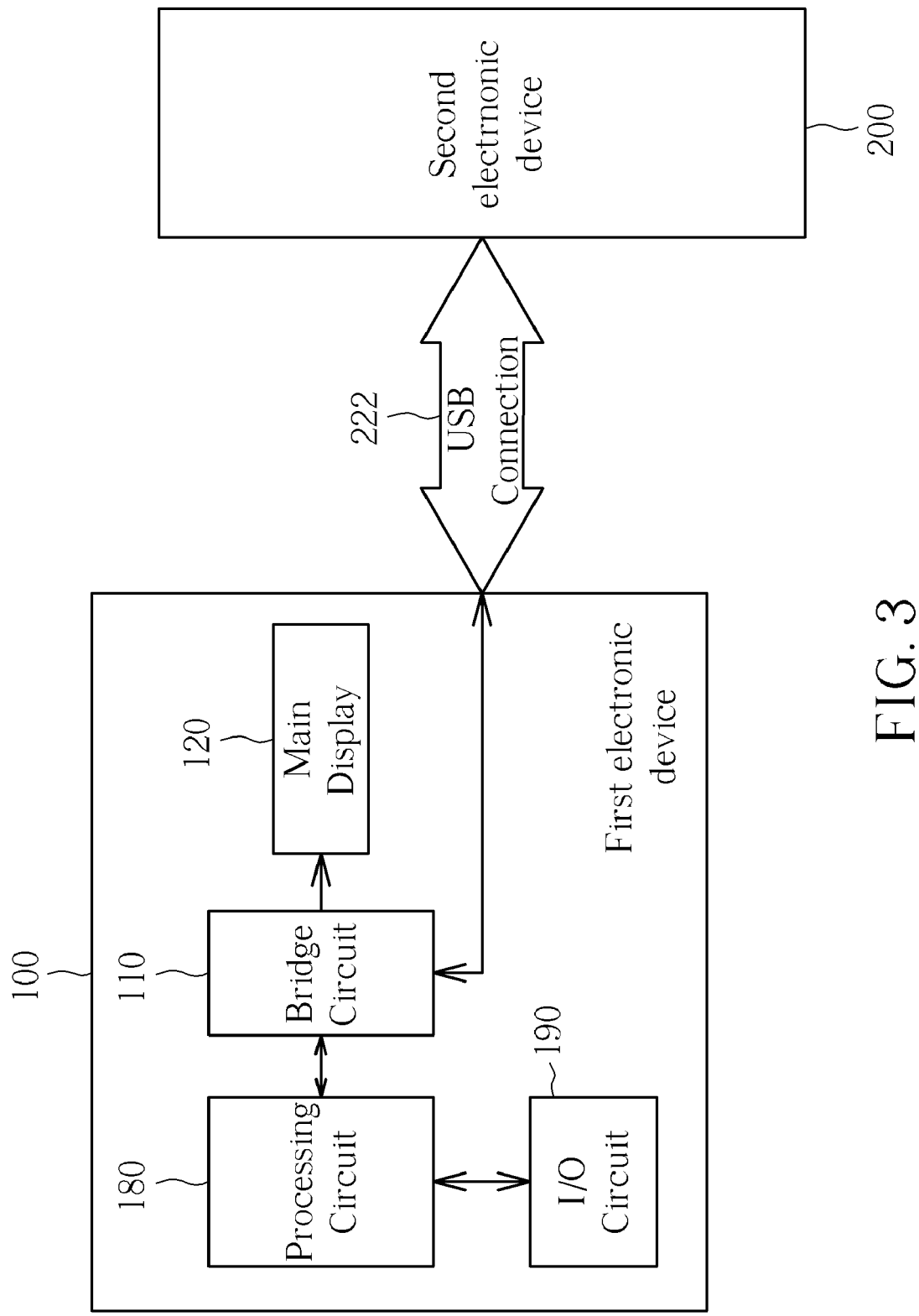
FIG. 3 is a block diagram of the first electronic device and the second electronic device according to a third exemplary embodiment of the present invention.

Please refer to FIG. 3, which depicts a third exemplary embodiment of the present invention. The first electronic device 100 and the second electronic device 200 in the third embodiment are approximately the same as the foregoing embodiments. But the first electronic device 100 is coupled to the second electronic device 200 by an USB connection 222 which is different from the USB/HDMI/LVDS connection 111 as shown in FIG. 2 of the second exemplary embodiment of the present invention. Concerning USB connection 222, a signal transmitted therethrough has a physical layer compliant with USB standard and a protocol layer different from the USB standard. In addition, the signal transmitted to the second electronic device 200 is encoded by the bridge circuit 110 rather than the I/O circuit 190. The bridge circuit 110 encodes video frame data into output signal that has a physical layer compliant with the USB standard and a protocol layer different from the USB standard. Also, the bridge circuit 110 encodes all received video frame data from the processing circuit 180 into display signals such as RGB component so that the received video frame data can be correctly received and displayed by the main display 120. In conclusion, the third embodiment of the present invention discloses a way of transmitting a output signal (i.e., video signal) that is not processed (or encoded) by the traditional I/O circuit 190 from the first electronic device 100 to the second electronic device 200 through a conventional USB connection. Most important of all, although the output signal is transmitted through a conventional USB connection, the protocol layer of the output signal is different from the USB standard and only the physical layer of the output signal is compliant with the USB standard.

Figure 4:
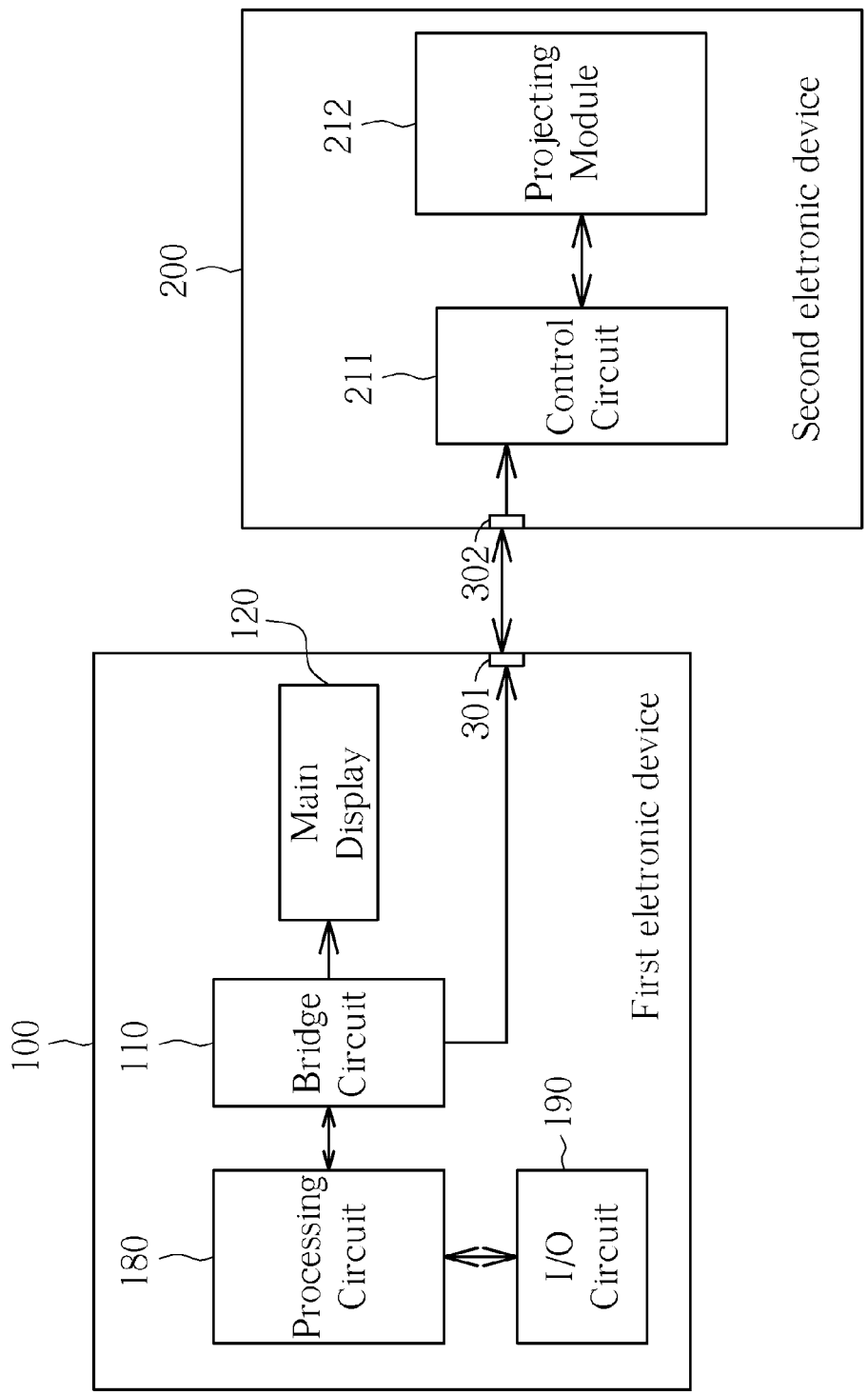
FIG. 4 is a detailed block diagram of the first electronic device and the second electronic device shown in FIG. 3 according to the third exemplary embodiment of the present invention.

Please refer to FIG. 4, which further exhibits a detailed block diagram based on the third embodiment of the present invention as shown in FIG. 3. Basically, the operations and functions of sub circuits in the first electronic device 100 are similar to those in the foregoing description, so detailed descriptions are omitted here for the sake of brevity. As shown in FIG. 4, the electronic device 100 includes an output port 301 while the second electronic device 100 includes an input port 302. The first and second electronic devices utilize ports 301 and 302 to establish the data connection. Both of ports 301 and 302 are configured for connecting connectors with a connector type compliant with the normal USB standard. In addition, signals transmitted via the specific port 301 and 302 are encoded to have a physical layer compliant with USB standard and have protocol layer different from USB standard by the bridge circuit 110; that is, signals transmitted via specific ports 301 and 302 have a specific protocol (e.g. packet type, packet format . . . and so on) of customized format.

In the first electronic device 100, the processing circuit 180 generates each video frame according to input data, and then forwards video frame data to the bridge circuit 110 and then, video frame data are encoded by the bridge circuit 110 to have a specific protocol layer different from USB standard by the I/O circuit 190. Also, video can still be displayed on the main display 120 by the bridge circuit 110 encoding video frame data into conventional display signal format (e.g. RGB component signals). The second electronic device 200 includes (but is not limited to): the input ports 302, a control circuit 211, and a projecting module 212. The projecting module 212 is utilized for projecting an image onto a projection screen (not shown) using its inner lens apparatus (not shown) according to the received corresponding video signals. In one embodiment, the second electronic device 200 is a portable projector. The second electronic device 200 receives signals through the input port 302. Then, the control circuit 211 processes the received video frame data contained in the output signals through ports 301 and 302 to generate a display signal (e.g. RGB component signals) to drive the projecting module 212. It should be noted that the received signals outputted from the port 301 are compliant with the physical layer of the USB standard. Thus, they can be correctly processed by a receiving circuit inside the control circuit 211.

In conclusion, when the video signal is transmitted via the ports 301 and 302, the bridge circuit 110 encodes the video frame data with a customized format to fit the ports 301 and 302 correspondingly. As mentioned above, the ports 301 and 302, such as USB ports, are fit in with USB standard, the signals transmitted via the ports 301 and 302 have the physical layer compliant with USB standard. However, to increase the flexibility of the present invention, these signals have the protocol layer different from USB standard, which is the most essential spirit of the present invention.

Figure 5:
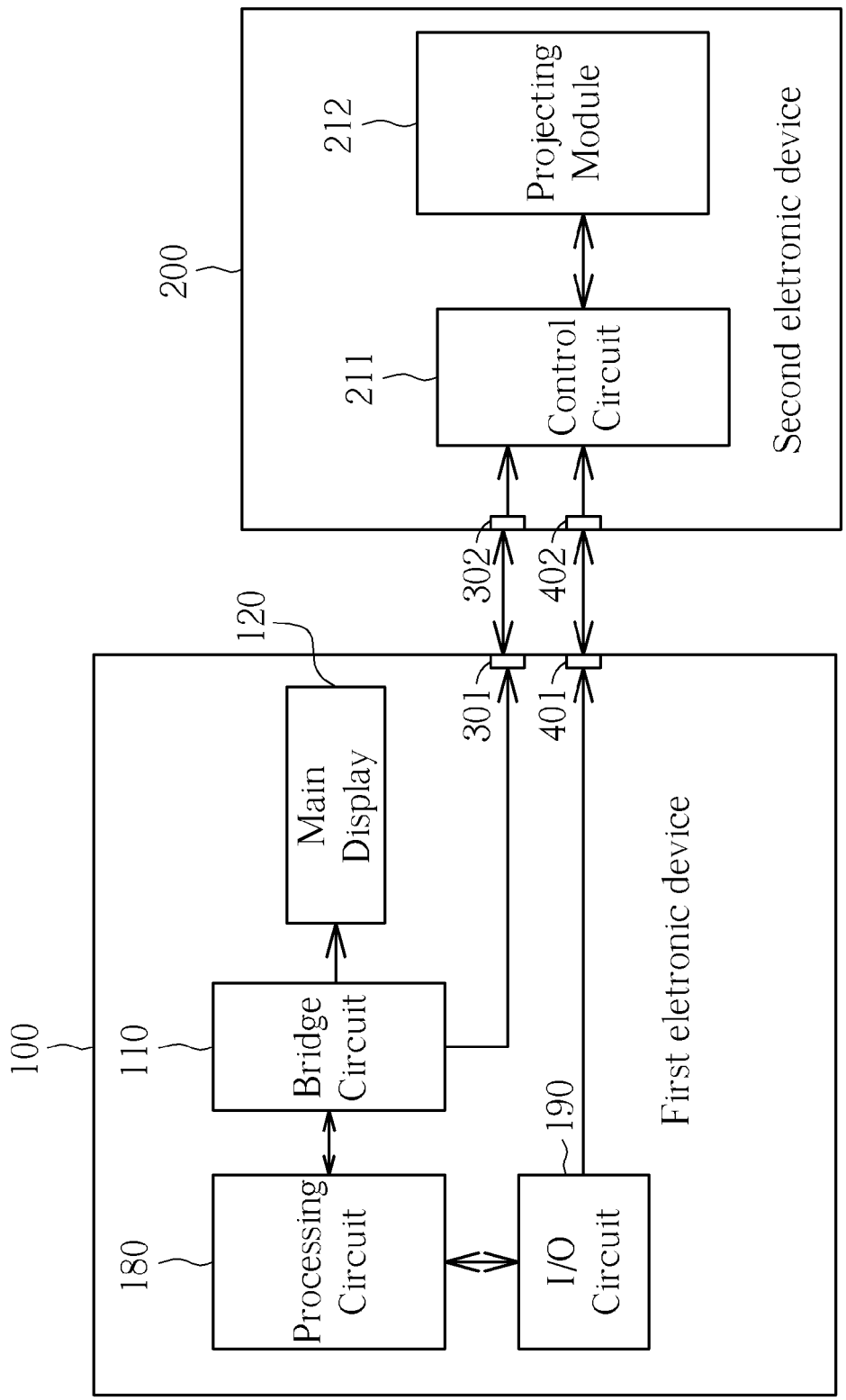
FIG. 5 is a detailed block diagram of the first electronic device and the second electronic device according to another exemplary embodiment of the present invention.

Please refer to FIG. 5, which depicts an exemplary embodiment incorporating features of exemplary embodiments as shown in FIG. 2 and FIG. 3. The first electronic device 100 transmits signals to the second electronic device 200 through ports 301 and 401, wherein signals transmitted via ports 301 and 302 are encoded with the customized format as mentioned above and signals transmitted via ports 401 and 402 are encoded with a conventional format which could be one of USB standard, HDMI standard, and LVDS standard.

In this embodiment, the processing unit 180 transmits video frame data to the bridge circuit 110 or the I/O circuit 190 according to user's requirement. For example, if a user wants to use the second electronic device 200 (e.g. portable projector) for displaying, and he/she connects the first electronic device 100 and the second electronic device 200 via USB/HDMI/LVDS connection (via ports 401 and 402), the processing circuit 180 forwards video frame data into the I/O circuit 190. Then, the I/O circuit 190 processes video frame data into video signals with USB/HDMI/LVDS format. Thus, video signals can be transmitted to the second electronic device. However, if the user connects the first electronic device 100 and the second electronic device 200 via the ports 301 and 302, the processing circuit 180 forwards video frame data into bridge circuit 110 rather than the I/O circuit 190. In this embodiment, according to the customized format, the bridge circuit 110 encodes video frame data into video signal that has the physical layer compliant with USB standard and the protocol layer different from USB standard. In addition, the bridge circuit 110 encodes video frame data into display signals such as RGB format or YUV format so that the received video frame data can be displayed on the main display 120. As described above, video signals can be selectively transmitted from one of ports 301 and 401 of the first electronic device 100 to ports 302 or 402 of the second electronic device 200.

In addition, the bridge circuit 110 also compresses the video frame data if needed (e.g. a bit rate of video frame data is significant larger than the bandwidth of the data connection). In this embodiment, the I/O circuit 190 could have an USB/HDMI/LVDS controller (not shown) included therein, and the received video frame data will be further converted into video signals that are compliant with HDMI standard, LVDS standard or USB standard according to the command of the processing circuit 180.

Figure 6:
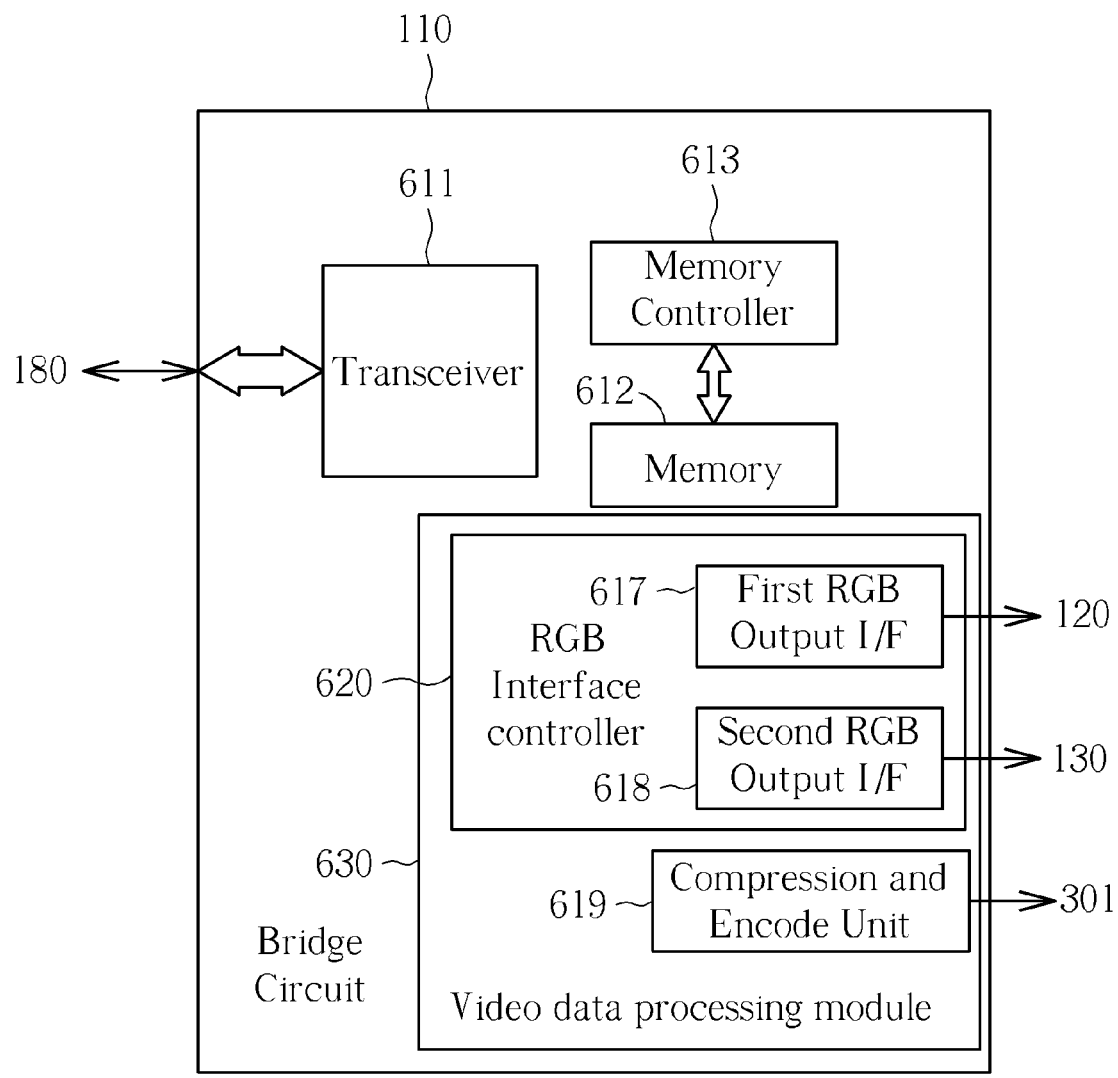
FIG. 6 is a detailed block diagram of the bridge circuit according to one exemplary embodiment of the present invention.

A block diagram of an embodiment of the bridge circuit 110 is illustrated in FIG. 6. As shown in FIG. 6, the bridge circuit 110 includes (but is not limited to): a transceiver 611, a memory 612, a memory controller 613 and a video data processing module 630. The video data processing module 630 has a RGB interface controller 620 and a compression and encode unit 619, where the RGB interface controller 620 has a first RGB output interface 617 and a second RGB output interface 618 for respectively connecting and transmitting display signals to a main display 120 and a embedded projecting module 130.

The transceiver 611 is utilized for transmitting and receiving signals carrying video frame data or commands to/from the processing circuit 180. The memory 612 serves as a frame buffer in the bridge circuit 110 and the memory controller 613 is utilized for controlling the writing/reading of the memory 612. After received, the video frame data is transmitted to the video data processing module 630 for processing the received video frame data to determine whether video frame data is transmitted into the first and second RGB output interfaces 617 and 618 or transmitted to the compression and encode unit 619. If the video frame data is transmitted into the output interfaces (i.e., the first RGB output interface 617 and the second RGB output interface 618), the video frame data is converted into RGB component display signals corresponding video frame data and then, the display signals is transmitted to the main display 120 and the embedded projecting module 130. If the video frame data is transmitted into the compression and encode unit 619, a decision will be made as to whether the video frame data needs to be compressed depending on requirements and the compressed/uncompressed video frame data is encoded to be an output signal that has the physical layer compliant with the USB standard and the protocol layer different from USB standard. Thus, the signals outputted from the compression and encode unit 619 can fit with the USB profile by the output port 301.

Figure 7:
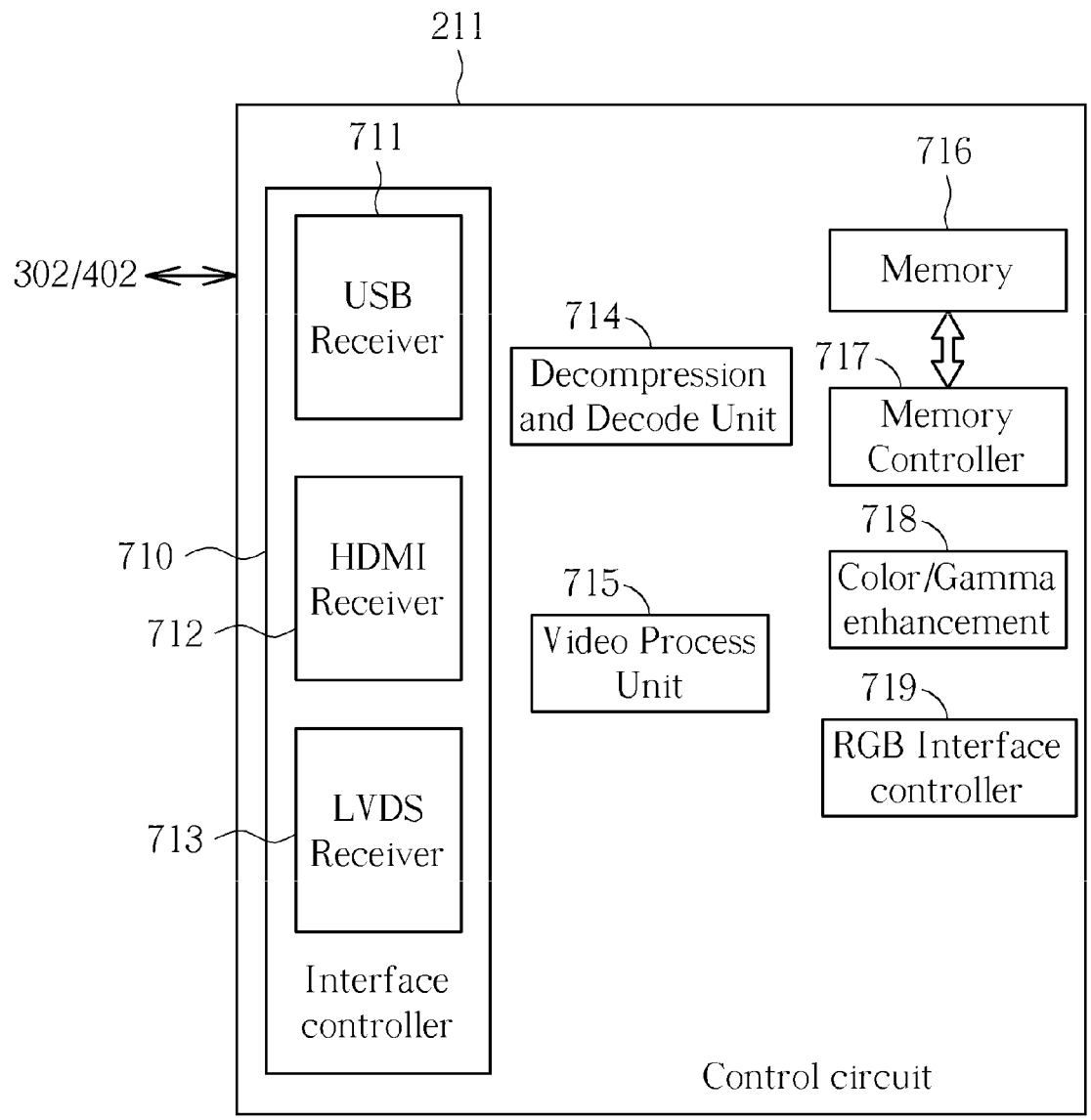
FIG. 7 is a detailed block diagram of the control circuit according to one exemplary embodiment of the present invention.

A block diagram of an embodiment of the control circuit 211 mentioned above is illustrated in FIG. 7. As shown in FIG. 7, the control circuit 211 includes (but is not limited to): a interface controller 710 comprising a USB receiver 711 and/or an HDMI receiver 712 and/or a LVDS receiver, a decompression and decode unit 714, a video process unit 715, a memory 716, a memory controller 717, a color/gamma enhancement unit 718, and a RGB interface controller 719. The interface controller 710 is coupled to the input ports 302 and/or 402 and utilized for receiving the input signals from the input ports 302 and/or 402. Since signals transmitted via the specific input port 302 and/or the input port 402 (when the input port 402 serves as a common USB port) both have the physical layer compliant with USB standard, the USB receiver 711 in the interface controller 710 can correctly derive these signals. The interface controller 710 may further comprises the HDMI receiver 712 and/or the LVDS receiver 713, for receiving video signals that are encoded with normal HDMI standard and/or LVDS standard. The decompression and decode unit 714 is coupled to the interface controller 710 and for converting the input signal into video frame data. For example, when the input signals are encoded in the customized format, which has a protocol layer different from USB standard, the decompression and decode unit 714 can decode correspondingly. Also, if video frame data contained in signals transmitted via ports 302 and 402 have ever been compressed by the bridge circuit 110, the decompression and decode unit 714 is utilized for decompressing the compressed video frame data. The memory 716 serves as a frame buffer and the memory controller 717 is utilized for controlling the writing/reading of the memory 716. The color/gamma enhancement unit 718 is utilized for performing color/gamma enhancement upon the video frame data to be displayed, if needed. The RGB interface controller 719 is utilized for generating a plurality of display signals corresponding to the video frame data for coupling the projecting module 212 and transmitting the display signals of RGB format to drive the projecting module 212 for video displaying.

In the foregoing paragraphs, the present invention has been described with reference to specific exemplary embodiments thereof. However, it will be evident that various modifications and changes may be made thereto without departing from the broader spirit and scope of the invention as set forth in the following claims. Accordingly, the specification and drawings are to be regarded in an illustrative sense rather than a restrictive sense.

Moreover, it should be noted that any reference in the specification to "one embodiment" or "an embodiment" means that a particular feature, structure, or characteristic described in connection with the embodiment is included in at least one implementation. The appearances of the phrase "in one embodiment" in various places in the specification do not necessarily all refer to the same embodiment. Thus, although embodiments have been described in language specific to structural features and/or methodological acts, it is to be understood that claimed subject matter is not limited to the specific features or acts described. Rather, the specific features and acts are disclosed as sample forms of implementing the claimed subject matter.

In conclusion, the concept of the present invention employs the popularity and convenience of the USB connecting ports and connectors. By properly processing the video frame data into video signals that has the physical layer compliant with USB standard and the protocol layer different from USB standard, the video signals can be transmitted over the USB connecting ports and connectors. Such video signals can also be received by the conventional USB receiving circuit, so it does not increase the hardware cost very much but increase the flexibility of the design of the electronic devices. In particular, for handheld computers and electronic devices such as Mobile Internet Device (MID) or Netbook, the multi-display solution is important, and the concept of the present invention can also provide an excellent display connecting solution to meet the application requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a first output port, configured for connecting a connector with a connector type complying with a specific signal transmission standard;
   a processing circuit, for processing an input data to generate an output data, wherein the output data comprises video frame data;
   a bridge circuit, coupled between the processing circuit and the first output port, for receiving the output data generated from the processing circuit, converting the output data into an output signal which has a physical layer compliant with the specific signal transmission standard and a protocol layer different from the specific signal transmission standard, and then outputting the output signal through the first output port;
   a second output port; and
   an input/output (I/O) controller, coupled between the processing circuit and the second output port, for receiving the video frame data from the processing circuit, converting the video frame data into a plurality of video signals, and then outputting the video signals to the second output port.

2. The electronic device of claim 1, wherein the specific signal transmission standard is a universal serial bus (USB) standard.

3. The electronic device of claim 1, wherein the bridge circuit comprises:
   a transceiver, coupled to the processing circuit for receiving the video frame data; and
   a video data processing module, coupled to the transceiver for processing the received video frame data, comprising:
      a RGB interface controller, for generating a plurality of display signals corresponding to the video frame data; and
      a compression and encode unit, for converting the video frame data into the output signal having the protocol layer different from the specific signal transmission standard.

4. The electronic device of claim 3, further comprising a main display for displaying the display signals via the RGB interface controller.

5. The electronic device of claim 3, wherein the output signal is transmitted to a detachable display device via the first output port.

6. The electronic device of claim 1, wherein the second output port comprises one of a universal serial bus (USB) port, a low-voltage differential signaling (LVDS) port, and a high definition multimedia interface (HDMI) port.

7. The electronic device of claim 1, being a mobile internet device (MID) or a Netbook.

8. An electronic system, comprising:
   a first electronic device, comprising:
      a first output port, configured for connecting a connector with a connector type complying with a specific signal transmission standard;
      a processing circuit, for processing an input data to generate an output data, wherein the output data comprises video frame data;
      a bridge circuit, coupled between the processing circuit and the first output port, for receiving the output data generated from the processing circuit, converting the output data into an output signal which has a physical layer compliant with the specific signal transmission standard and a protocol layer different from the specific signal transmission standard, and then outputting the output signal through the first output port;
      a second output port; and
      an input/output (I/O) controller, coupled between the processing circuit and the second output port, for receiving the video frame data from the processing circuit, converting the video frame data into a plurality of video signals, and then outputting the video signals to the second output port; and
   a second electronic device, comprising:
      an input port, for receiving the output signal from the output port of the first electronic device through the connector with the connector type complying with the specific signal transmission standard; and
      a control circuit, coupled to the input port, for generating a display signal corresponding to the output signal.

9. The electronic system of claim 8, wherein the specific signal transmission standard is a universal serial bus (USB) standard.

10. The electronic system of claim 8, wherein the control circuit comprises:
    an interface controller, coupled to the input port for receiving the output signal from the input port;
    a decompression and decode unit, coupled to the interface controller for converting the output signal into video frame data; and
    a RGB interface controller, for generating a plurality of display signals corresponding to the video frame data.

11. The electronic device of claim 10, wherein the interface controller comprises a universal serial bus (USB) receiver, a low-voltage differential signaling (LVDS) receiver, and a high definition multimedia interface (HDMI) receiver.

12. The electronic device of claim 10, further comprising a projecting module coupled to the control circuit for displaying the display signals.

13. The electronic device of claim 8, being a detachable projector.

* * * * *